(12) United States Patent
McKinster et al.

(10) Patent No.: US 7,089,917 B1
(45) Date of Patent: Aug. 15, 2006

(54) SNOWMOBILE FUEL SYSTEM SUMP TANK (75) Inventors: Scott E. McKinster, Salol, MN (US);
John A. Crudden, Roseau, MN (US);
Kevin Ness, Roseau, MN (US);
Richard A. Frederickson, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 10/869,423

(22) Filed: Jun. 16, 2004

(51) Int. Cl.
*F02M 37/10* (2006.01)
*B62M 27/02* (2006.01)

(52) U.S. Cl. ............... 123/509; 280/834; 180/190
(58) Field of Classification Search ........... 123/509; 280/834; 180/182, 186, 190
See application file for complete search history.

(56) References Cited

U.S. PATENT DOCUMENTS

| | | | | |
|---|---|---|---|---|
| 5,170,764 A | * | 12/1992 | Tuckey | 123/509 |
| 6,062,203 A | * | 5/2000 | Takahashi et al. | 123/509 |
| 6,314,995 B1 | * | 11/2001 | Meyer | 137/565.22 |
| 6,453,884 B1 | * | 9/2002 | Ushigome | 123/509 |
| 6,550,811 B1 | * | 4/2003 | Bennett et al. | 280/833 |
| 6,578,727 B1 | | 6/2003 | Schmidt et al. | 220/562 |
| 6,679,399 B1 | | 1/2004 | Franjo et al. | 220/562 |
| 6,712,234 B1 | | 3/2004 | Boecker | 220/563 |
| 6,832,602 B1 | * | 12/2004 | Tanimura | 123/509 |
| 2003/0198768 A1 | | 10/2003 | Delbarre | 428/36.6 |

FOREIGN PATENT DOCUMENTS

| | | |
|---|---|---|
| EP | 1122113 | 2/2002 |
| EP | 1442910 | 1/2004 |
| JP | 2001289134 A | * 10/2001 |

OTHER PUBLICATIONS

"Integrated Fuel Tank Reduces Emissions", *Modern Plastics*, vol. 79(1) 2002.
"T1 Develops Industry-First Fuel Tank System for Ford GT", *Business Wire*, Apr. 7, 2003.

* cited by examiner

*Primary Examiner*—Kevin Hurley
(74) *Attorney, Agent, or Firm*—Baker & Daniels LLP (57) ABSTRACT

In some embodiments, a fuel sump system may include one or more of the following features: (a) a fuel tank, (b) a fuel sump tank in fluid communication with the fuel tank to receive fuel from the fuel tank, (c) a fuel pump having an intake positioned in the sump tank to pump fuel from the sump tank to an engine via a fuel supply line, (d) a fuel return line in fluid communication with the engine for returning fuel the fuel return line being in fluid communication with the sump tank to supply returned fuel to the sump tank, (e) a fuel pressure regulator operably coupled to the return line, and (f) a transfer pump operatively coupled to the fuel tank and the sump tank for transferring fuel from the fuel tank to the sump tank.

37 Claims, 8 Drawing Sheets

SNOWMOBILE FUEL SYSTEM SUMP TANK

FIELD

This disclosure relates to powered vehicles and more particularly to snowmobiles, all terrain vehicles, personal watercraft, utility vehicles, motorcycles having a fuel system. More particularly this disclosure relates to operable fuel systems in vehicles operating at extreme attitudes.

BACKGROUND

Removal of fuel from a fuel tank of a vehicle operating at extreme attitudes presents unique challenges not present in typical automotive applications. Fuel injection systems operate with a nearly constant flow of fuel through a, typically, electric fuel pump at flow rates well in excess of the maximum engine fuel demand. These high fuel rates greatly increase the probability that air will be drawn into the pump, and thus the fuel rail, and this can cause erratic engine performance ranging from misfire to engine shut off and can in turn cause damage to the engine. Current designs to overcome this problem involve the use of two or more pickups placed on the periphery of the fuel tank. These pickups are intended to close when no fuel is present, and then reopen when fuel returns. These pickups can be placed in series, parallel, or a combination so as to increase the likelihood that at least one pickup will be submerged in fuel. If two or more pickups are simultaneously above the fuel level, or if the fuel moves in the tank rapidly enough to uncover the pickups in quick succession so that one pickup closes before the previous one opens as can happen when a vehicle is operating at extreme attitudes, then all the pickups may close and not reopen when the fuel recovers them. This can occur even with as much as 30% of the total fuel capacity of the fuel tank still present and can lead to unexpected engine shut off, and, in some cases, the inability to restart the engine even after additional fuel is added to the fuel tank. This is due to the inability of the fuel pickups to open against the vacuum created by the fuel pump intake when the intake flow is sufficiently reduced or shut off.

Fuel systems of vehicles operating at extreme attitudes need to be more reliable. Fuel systems need to provide the ability to empty the fuel tank at normal and extreme attitudes. Fuel systems also need to provide even fuel delivery for consistent vehicle performance.

SUMMARY

In some embodiments, a snowmobile may include one or more of the following features: (a) a chassis, (b) a straddle-type seat mounted to the chassis, (c) a handlebar assembly carried by the chassis, (d) an endless track carried by a rear suspension system mounted to the chassis, (e) a front suspension system mounted to the chassis, (f) left and right steerable skis carried by the front suspension system, the skis being steerably connected to the handlebars, (g) a fuel injected engine operably coupled to drive the endless track, (h) a fuel tank, (i) a sump tank operatively coupled with the fuel tank, (j) a fuel pump coupled to the sump tank, (k) a fuel supply line coupled to the fuel pump and to the engine, (l) a fuel return line in fluid communication with the engine for returning fuel, the fuel return line being in fluid communication with the sump tank to supply returned fuel to the sump tank, (m) a check valve located at the bottom of the sump tank that passes fuel from the fuel tank to the sump tank, and (n) a transfer pump operatively coupled to the fuel tank and the sump tank for transferring fuel from the fuel tank to the sump tank.

In some embodiments, a snowmobile may include one or more of the following features: (a) a chassis, (b) a straddle-type seat mounted to the chassis, (c) a handlebar assembly carried by the chassis, (d) an endless track carried by a rear suspension system mounted to the chassis, (e) a front suspension system mounted to the chassis, (f) left and right steerable skis carried by the front suspension system, the skis being steerably connected to the handlebars, (g) a fuel injected engine operably coupled to drive the endless track, (h) a fuel tank, and (i) means for providing fuel to the engine even when the fuel tank experiences extreme attitudes.

In some embodiments, a fuel sump system may include one or more of the following features: (a) a fuel tank, (b) a fuel sump tank in fluid communication with the fuel tank to receive fuel from the fuel tank, (c) a fuel pump having an intake positioned in the sump tank to pump fuel from the sump tank to an engine via a fuel supply line, (d) a fuel return line in fluid communication with the engine for returning fuel the fuel return line being in fluid communication with the sump tank to supply returned fuel to the sump tank, (e) a fuel pressure regulator operably coupled to the return line, and (f) a transfer pump operatively coupled to the fuel tank and the sump tank for transferring fuel from the fuel tank to the sump tank.

In some embodiments, a fuel sump for a snowmobile may include one or more of the following features: (a) a fuel injected engine to power the snowmobile, (b) a fuel tank, and (c) means for providing fuel to the engine even when the fuel tank experiences extreme attitudes.

In some embodiments, a method for providing fuel to a fuel injected, off road vehicle selected from the group consisting of snowmobiles, personal watercraft, utility vehicles, motorcycles, and all terrain vehicles may include one or more of the following features: (a) transferring the fuel from a fuel tank into a sump tank, (b) pumping the transferred fuel from the sump tank to an engine in the vehicle, and (c) returning fuel that is not fuel injected into the engine; and feeding the returning fuel through tubing to the sump tank.

In some embodiments, a system to provide fuel to an engine during extreme attitudes may include one or more of the following features: (a) means for transferring the fuel from a fuel tank into a sump tank, (b) means for pumping the transferred fuel from the sump tank to an engine in the vehicle, (c) means for returning fuel that is not fuel injected into the engine, and (d) means for feeding the returning fuel through tubing to the sump tank.

DESCRIPTION OF VARIOUS EMBODIMENTS

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to the embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives that fall within the scope of the present teachings. Its understood that the embodiments of the present teachings can be applied to a fuel injected, off road vehicle such as snowmobiles, personal watercraft, utility vehicles, motorcycles, and all terrain vehicles however, the present teachings are currently discussed with reference to snowmobiles.

Figure 1A:
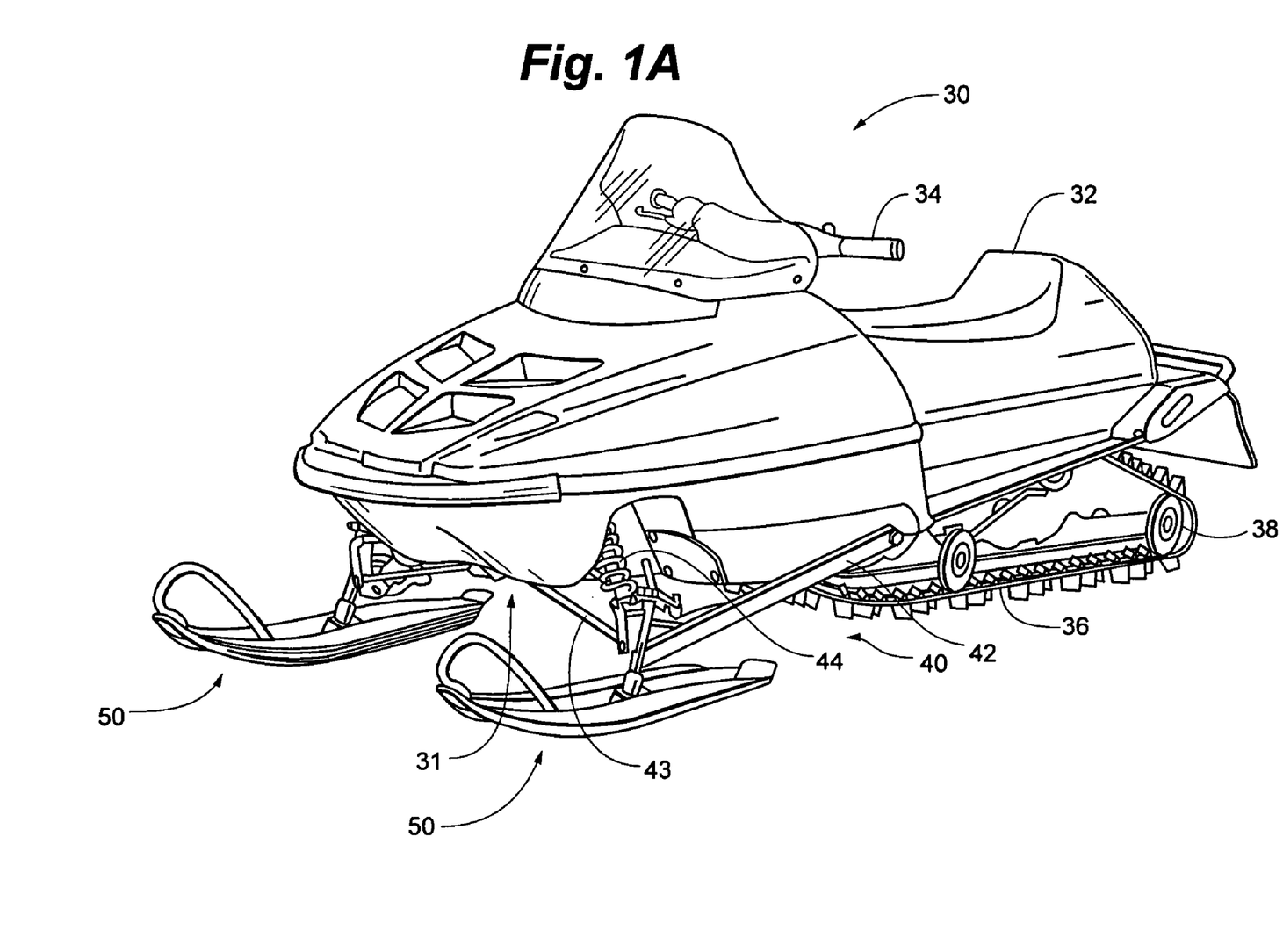
FIG. 1A shows a perspective view of a snowmobile that can incorporate some embodiments of the present teachings.

FIG. 1A depicts a snowmobile of the teachings. The snowmobile includes a chassis 31, a straddle type seat 32 mounted to the chassis 31, and a pair of handlebars 34 carried by the chassis 31 adjacent to the seat 32 so that a rider sitting in straddle fashion on the seat may steer the snowmobile using the handlebars 34. The snowmobile includes an endless track 36 carried by a rear suspension system 38 mounted to the chassis 31, the endless track being connected to and powered by the snowmobile's engine (typically located beneath the hood near the front of the snowmobile). A fuel tank may be located under seat 32.

Left and right steerable skis 50 are carried by a front suspension system 40, which in turn is mounted to the chassis 31. The suspension system may be of any suitable type. In the drawings a trailing arm suspension system is depicted, such a system utilizing, for each ski, a trailing arm 42 connected at its rear end to the chassis, a pair of generally transversely mounted radius rods 43 connected at their inner ends to the chassis and at their outer ends to the front end of the trailing arm, and a shock/spring combination 44 connected at one end to the chassis 31 and at the other end to the front end of the trailing arm 42. Other suitable suspensions could also be utilized, however, including, e.g., a double A-arm (sometimes called "double wishbone") suspension or a telescopic strut suspension.

Figure 1B:
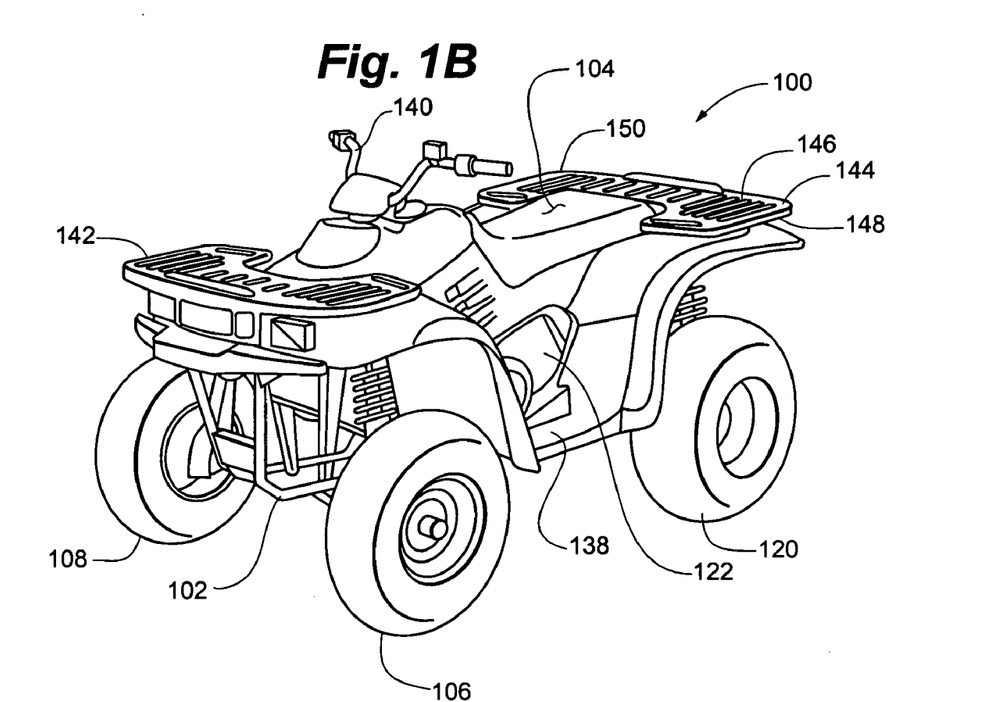
FIG. 1B shows a perspective view of an ATV that can incorporate some embodiments of the present teachings.

With reference to FIG. 1B, a perspective view of an ATV that can incorporate some embodiments of the present teachings is shown. Vehicle 100 of FIG. 1B can be generally referred to as an ATV. Vehicle 100 can have a chassis 102 carrying a straddle type seat 104. In FIG. 1B, straddle type seat 104 is sufficiently narrow to be straddled by a vehicle rider. Vehicle 100 can have a left front wheel 106, a right front wheel 108, a left rear wheel 120, and right rear wheel (not visible in FIG. 1B). Vehicle 100 can also include an engine 122 that is carried by chassis 102. Engine 122 can be coupled to at least some wheels of vehicle 100 via a drive train for propelling vehicle 100. Engine 122 can be used to power each rear wheel, and in some cases also each front wheel.

Vehicle 100 can also include a first footrest 138 that can be seen extending from one side of the chassis 102 in FIG. 1B. Vehicle 100 can also include a second footrest (not shown in FIG. 1B) that extends from the other side of the chassis. Vehicle 100 also includes member 140 that may be used for steering vehicle 100. In FIG. 1B, steering member 140 comprises a handlebar. Vehicle 100 can also include a front rack 142 and a rear rack 144. Rack 144 can have a top surface 146 and a bottom surface 148 coupled to chassis 102. Rack 144 can have at least one aperture 150 extending from top surface 146 to bottom surface 148.

Figure 1C:
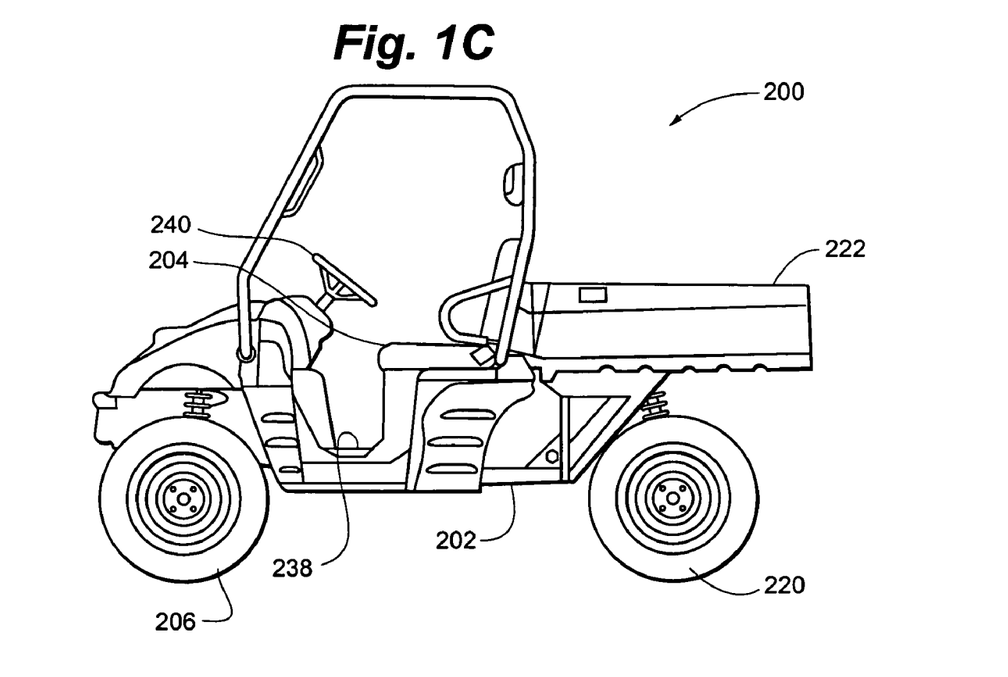
FIG. 1C shows a perspective view of a utility vehicle that can incorporate some embodiments of the present teachings.

With reference to FIG. 1C, a perspective view of a utility vehicle that can incorporate some embodiments of the present teachings is shown. Vehicle 200 of FIG. 1C can be generally referred to as a utility vehicle. Vehicle 200 can have a chassis 202 carrying a bench type seat 204. In FIG. 1C, bench type seat 204 can be sufficiently wide to hold more than one vehicle rider. It is contemplated the embodiments for FIGS. 1B and 1C could have two seats, a seat large enough for two or more people to straddle, or two-up side-by-side seating such as bucket style seats with out departing from the spirit of the present teachings. Vehicle 200 can have a left front wheel 206, a right front wheel (not visible in FIG. 1C), a left rear wheel 220 and right rear wheel (not visible in FIG. 1C). Vehicle 200 can also include a footrest 238 that can be seen extending from one side of the chassis 202 to the other side. Vehicle 200 may also include a box 222 that extends from the rear of the chassis for carrying various items. Vehicle 200 can also include member 240 that may be used for steering vehicle 200. In the embodiment of FIG. 1C, steering member 240 comprises a steering wheel.

Figure 1D:
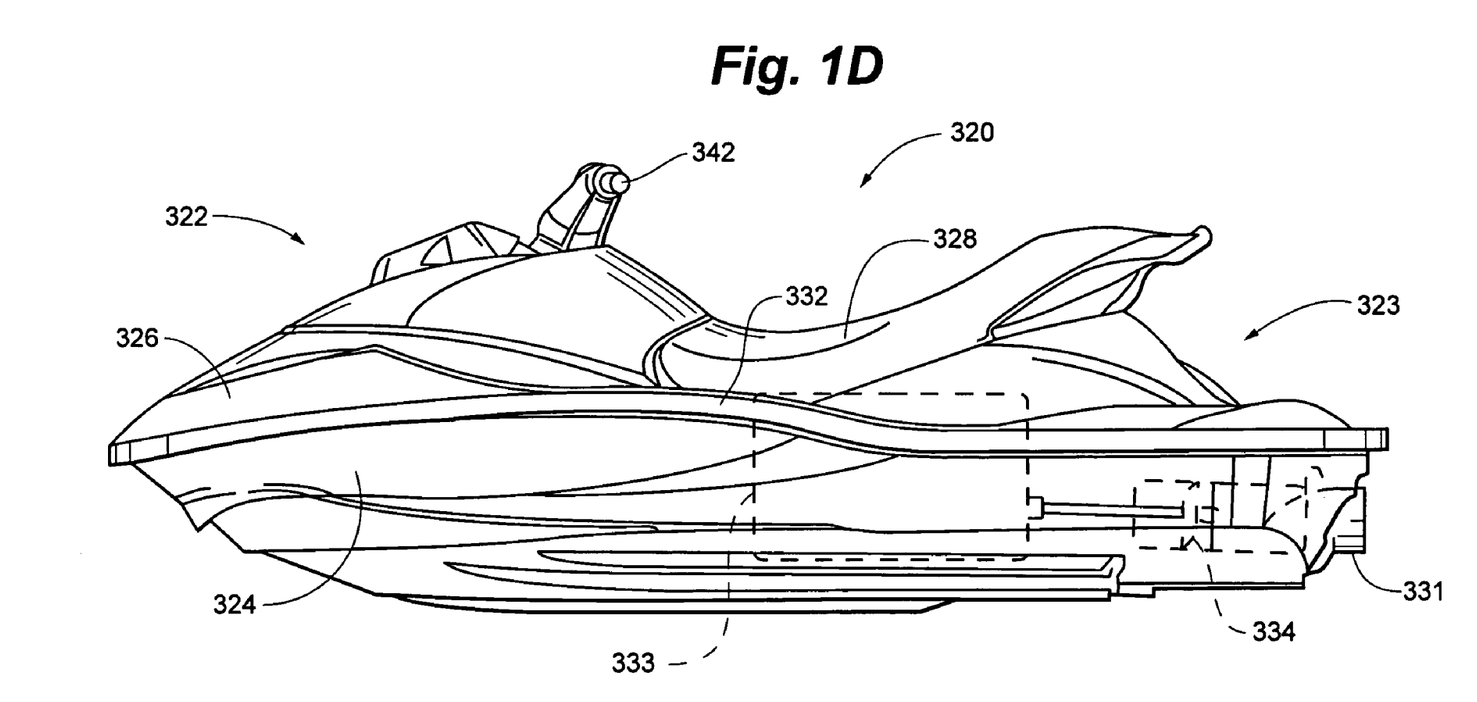
FIG. 1D shows a perspective view of a personal watercraft that can incorporate some embodiments of the present teachings.

With reference to FIG. 1D, a perspective view of a personal watercraft that can incorporate some embodiments of the present teachings is shown. FIG. 1D illustrates a personal watercraft 20 having generally a front or bow 322 and a rear or stern 323. The personal watercraft 320 includes a top deck 326 secured to a bottom hull 324 along an overlapping portion covered with a rub rail 332 in the embodiment illustrated, thereby forming a hull. An exhaust opening (not shown) can be located in top deck 326 or in bottom hull 324. The hull formed by the bottom hull 324 and top deck 326 define a compartment sized to contain an internal combustion engine 333 for powering the watercraft, and may also include one or more storage compartments, depending upon the size and configuration of watercraft 320. The deck portion 326 also has a raised, longitudinally extending seat 328 adapted to accommodate one or more riders seated in straddle fashion on the seat 328.

Engine 333 powers a jet propulsion unit 334, typically mounted in a tunnel at the bottom rear portion of watercraft 320. Jet propulsion unit 334 includes a steerable water discharge nozzle 331 that is operatively connected to a set of handlebars 342 to facilitate steering of watercraft 320 by the operator. Engine 333 may be of the two or four cycle variety. Of course, engine 333 may have one or more cylinders, as appreciated by those skilled in the art. In engines of the four-stroke variety, engine 333 includes a lubricating system (not shown). The lubricating system includes an oil reservoir (not shown) that must be drained and refilled routinely. Hull 324 may be made of any suitable material including molded fiberglass, reinforced resin plastic, and/or a sheet of molding compound. It is also further contemplated, the present teachings could be utilized in other watercraft such as motorboats without departing from the spirit of the invention.

Figure 2:
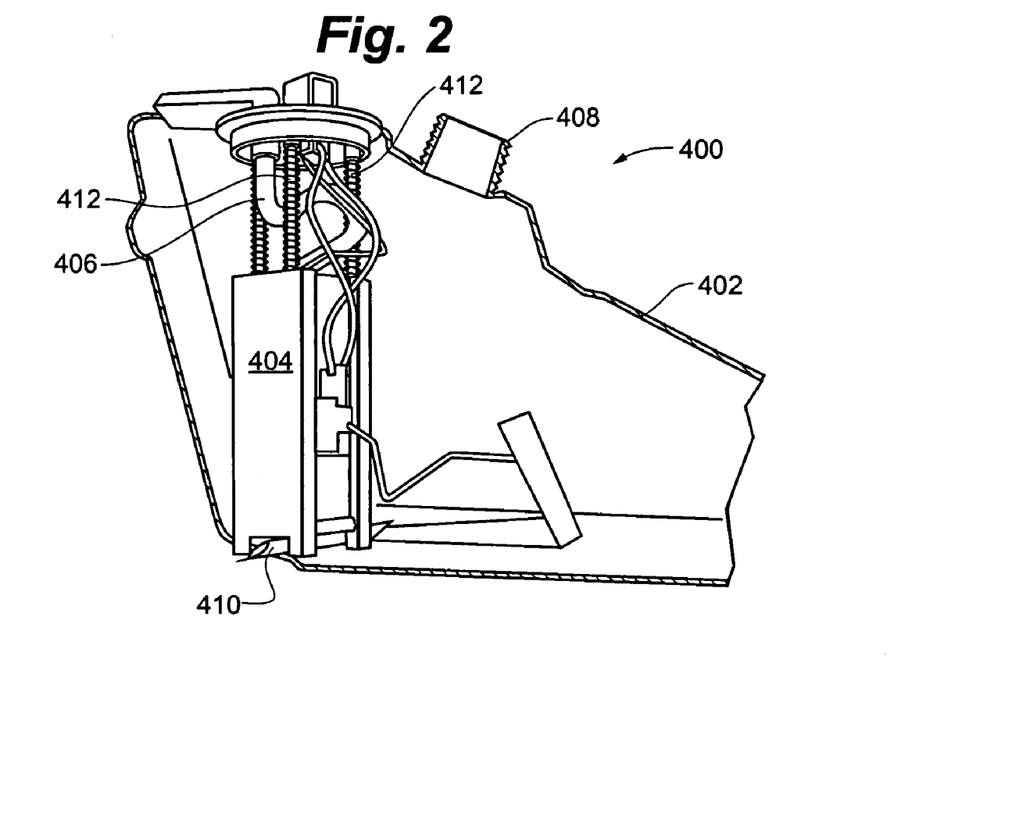
FIG. 2 shows a side cutaway view of a fuel tank with a sump system incorporating some embodiments of the present teachings.
Figure 3:
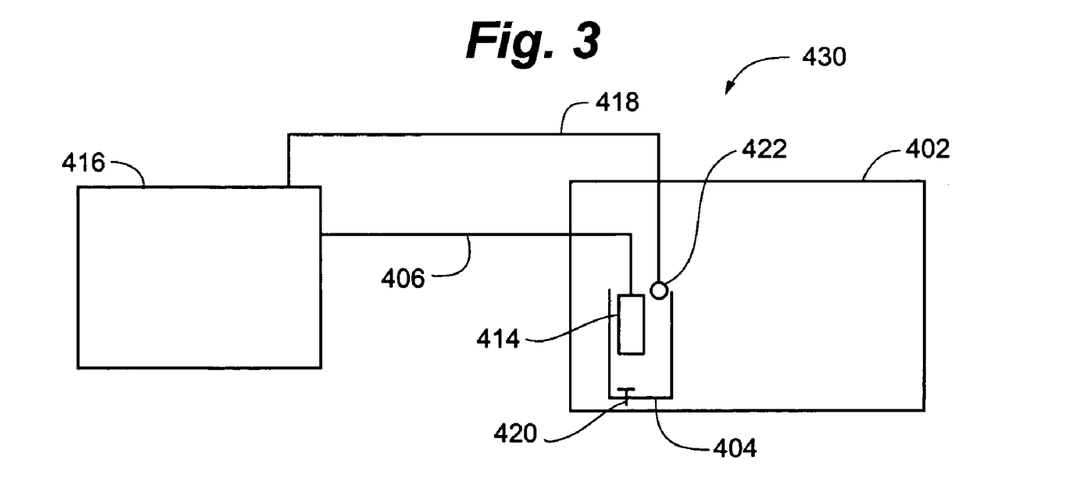
FIG. 3 shows a schematic representation of a fuel tank sump system incorporating some embodiments of the present teachings.

With reference to FIG. 2, a side cutaway view of a fuel tank with a sump system incorporating some embodiments of the present teachings is shown. A fuel sump tank system 400 can have a fuel tank 402, a sump tank 404 operatively coupled with fuel tank 402, a fuel pump 414 (FIG. 3) coupled to sump tank 404, and a fuel supply line 406 coupled to fuel pump 414 and to an engine 416 (FIG. 3). Fuel tank 402 can have a fuel inlet 408 where the operator can input fuel into the fuel tank 402. While sump tank 404 is illustrated being within fuel tank 402, it is fully contemplated sump tank 404 can be external to fuel tank 402 as is discussed in more detail below. It is also further contemplated fuel tank 402 and sump tank 404 could have any shape without departing from the spirit of the invention. As illustrated fuel tank 402 is a ten gallon fuel tank and sump tank 404 is a half gallon tank, however, it is fully contemplated tank 402 and sump tank 404 can be any size within reason.

It can be helpful if sump 404 were tall and skinny. Therefore, sump 404 would have a greater height with a smaller cross-section. Thus sump 404 is less likely to run dry at extreme attitudes. Because of packaging and volume constraints, though, providing a tall and narrow sump can be limited. For example, if sump 404 were very narrow, the sump volume wouldn't be great enough to be able to supply fuel for very long period of time should the fuel supply to sump 404 be removed. In addition, because of the packaging constraints on most vehicles, for example a snowmobile (e.g., most of the space on the snowmobile is already spoken for or already being used), sump 404 is typically of a certain shape and/or height. Accordingly, it is helpful for the sump to have a particular volume. If sump 404 is an internal sump, the height is limited to the height of tank 402.

As illustrated in FIG. 2, sump 404 can be attached to the top of fuel tank 402 such as with a big overriding nut or a ring with a series of bolts and a gasket. Rods 412 have springs around them and spring load sump 404 to the bottom of tank 402. However, it is contemplated sump tank 404 could be attached to the sides or bottom of tank 402 by simply bolting sump 404 to the side or bottom of tank 402. It can be helpful to reduce sump 404 from swinging around as much as possible and hold in place securely as much as possible. It is further contemplated sump tank 404 can be preformed or molded as part of tank 402. As discussed for FIG. 2, inside of sump 404 could be the main fuel pump 414 that can provide high fuel flow rates. On the inlet to pump 414 there can be a small filter attached to pump 414 to remove contaminates from the bottom of sump 404. Fuel supply line 406 is couple to fuel pump 414 which pumps fuel to engine 416 and through the fuel rail (not shown).

In some embodiments, discussed in more detail below, the fuel then travels back to tank 402 through a return line 418 (FIG. 3) to a fuel pressure regulator 422 (FIG. 3). When the fuel pressure reaches a predetermined level the fuel pressure pushes against a diaphragm and compresses a spring and in doing so it removes a plunger from its seat and allows fuel to pass through an orifice and back into tank 402 or into sump 404. When the fuel pressure drops below the predetermined pressure of regulator 422 the spring replaces the plunger in orifice and stops the fuel flow to raise the pressure. Generally, it is helpful if the fuel pressure holds the plunger just out of the seat so it maintains a level of pressure throughout the system and bypasses any excess flow that the pump creates. The outlet of pressure regulator 422 can be routed into sump 404 to assist in providing sump 404 with fuel. This also helps decrease the amount of fuel required within sump 404 as the amount of fuel being inputted into sump 404 only needs to be whatever engine 416 is actually requiring rather than what fuel pump 414 can pump. In some embodiments, fuel system 400 utilizes a deadhead system where fuel pressure regulator 422 is mounted on fuel supply line 406 of fuel pump 414 or near the outlet of pump 414. Here there is only a fuel line 406 running from tank 402 to engine 416 and no return line 418 running from engine 416 back to tank 402.

With reference to FIG. 3, a schematic representation of a fuel tank sump system incorporating some embodiments of the present teachings is shown. Fuel sump tank system 430 can have a fuel tank 402, a sump tank 404 operatively coupled with fuel tank 402, a fuel pump 414 coupled to sump tank 404, and a fuel supply line 406 coupled to fuel pump 414 and to an engine 416. As illustrated fuel pump 414 is within sump tank 404, however, it is contemplated fuel pump 414 can be external to sump tank 404 without departing from the spirit of the invention. Fuel system 400 can additionally have a fuel return line 418, as discussed above, in fluid communication with engine 416 for returning fuel where fuel return line 418 can be in fluid communication with sump tank 404 to supply returned fuel to sump tank 404 through pressure regulator 422. As illustrated, fuel lines 406 and 418 are located near the top of fuel tank 402 which is helpful as it puts the gasket near the top of tank 402 where it is likely not to be submerged in fuel at all times. This reduces the likelihood of fuel leakage that may happen if lines 406 and 418 came in through a portion of tank 402 generally submerged in fuel a majority of the time. However lines 406 and 418 can be located anywhere on tank 402 without departing from the spirit of the invention.

In operation, fuel is transferred from fuel tank 402 to sump 404 by gravity. Beneath sump tank 404 can be located a filter sock 410 (FIG. 2) where fuel can be transferred to sump tank 404 by a "U" tube effect through a check valve 420. Check valve 420 allows fuel to enter sump tank 404 through check valve 420, but fuel cannot exit through check valve 420. Instead the fuel will only be able to exit sump tank 404 if sump 404 is completely full and the fuel can run out over the top of sump 404. The fuel is then pumped by pump 414 through supply line 406 to engine 416. Alternatively, excess fuel to engine 416 can be transferred back to fuel tank 402 through return line 418 and into sump tank 422. In this embodiment, since check valve 420 is located at the bottom of fuel tank 402, sump 404 is provided with a continuous supply of fuel. Even if the vehicle were to experience extreme altitudes displacing the fuel away from check valve 420, sump 404 would have enough fuel in it to power engine 416 for a predetermined time frame depending upon the volume of sump 404.

Figure 4:
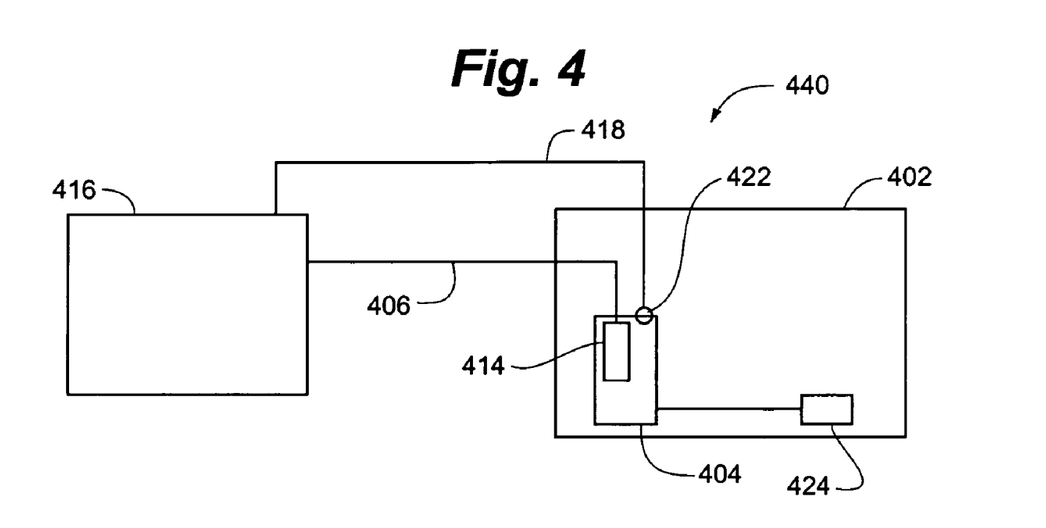
FIG. 4 shows a schematic representation of a fuel tank sump system incorporating some embodiments of the present teachings.

With reference to FIG. 4, a schematic representation of a fuel tank sump system incorporating some embodiments of the present teachings is shown. This embodiment is similar to FIG. 3, however, instead of using a gravity system to input fuel into sump 404, fuel system 440 can have a transfer pump 424 to transfer fuel to sump 404. Transfer pump 424 can continuously pump fuel into sump 404 and any excess would simply spill out over the top of sump 404. Once again, if the vehicle were to experience any extreme attitudes, sump 404 would still be provided fuel by transfer pump 424 and if by chance the fuel was displaced away from pump 424, sump 404 would have enough fuel to power engine 416 until pump 424 was within fuel once again.

Figure 5:
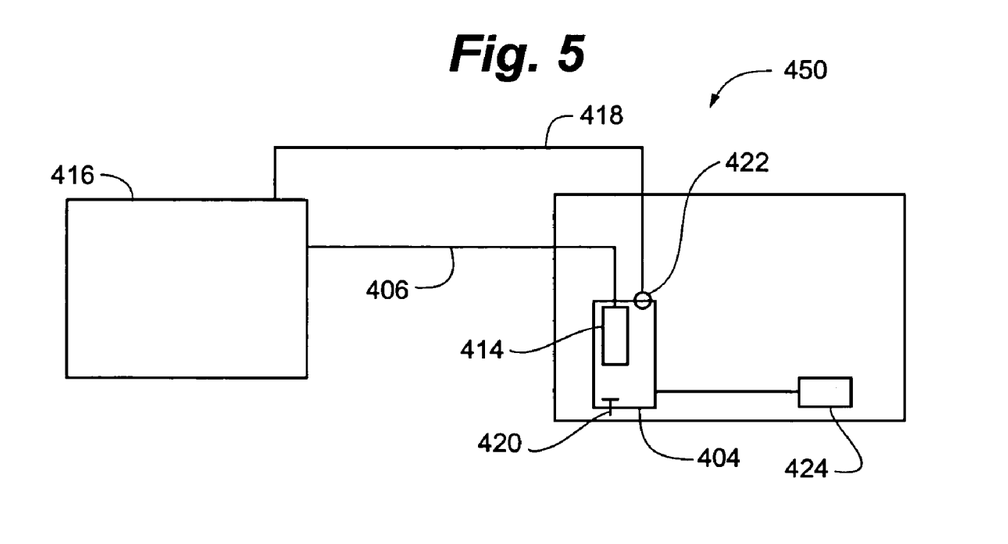
FIG. 5 shows a schematic representation of a fuel tank sump system incorporating some embodiments of the present teachings.

With reference to FIG. 5, a schematic representation of a fuel tank sump system incorporating some embodiments of the present teachings is shown. This embodiment is similar to FIGS. 3 and 4 in that it utilizes both a gravity system and a transfer pump 404. Fuel system 450 can have a check valve 420 provides the ability to have fuel flow into the sump if the vehicle is going down hill and transfer pump 422 were no longer covered by gas. Check valve 420 would allow fuel to go into sump 404 while the vehicle were going down hill, but then if the vehicle was going up hill check valve 420 would not allow fuel to flow out of sump 404 and transfer pump 424 would be under fuel and would be pushing gas up into sump 404.

Figure 6:
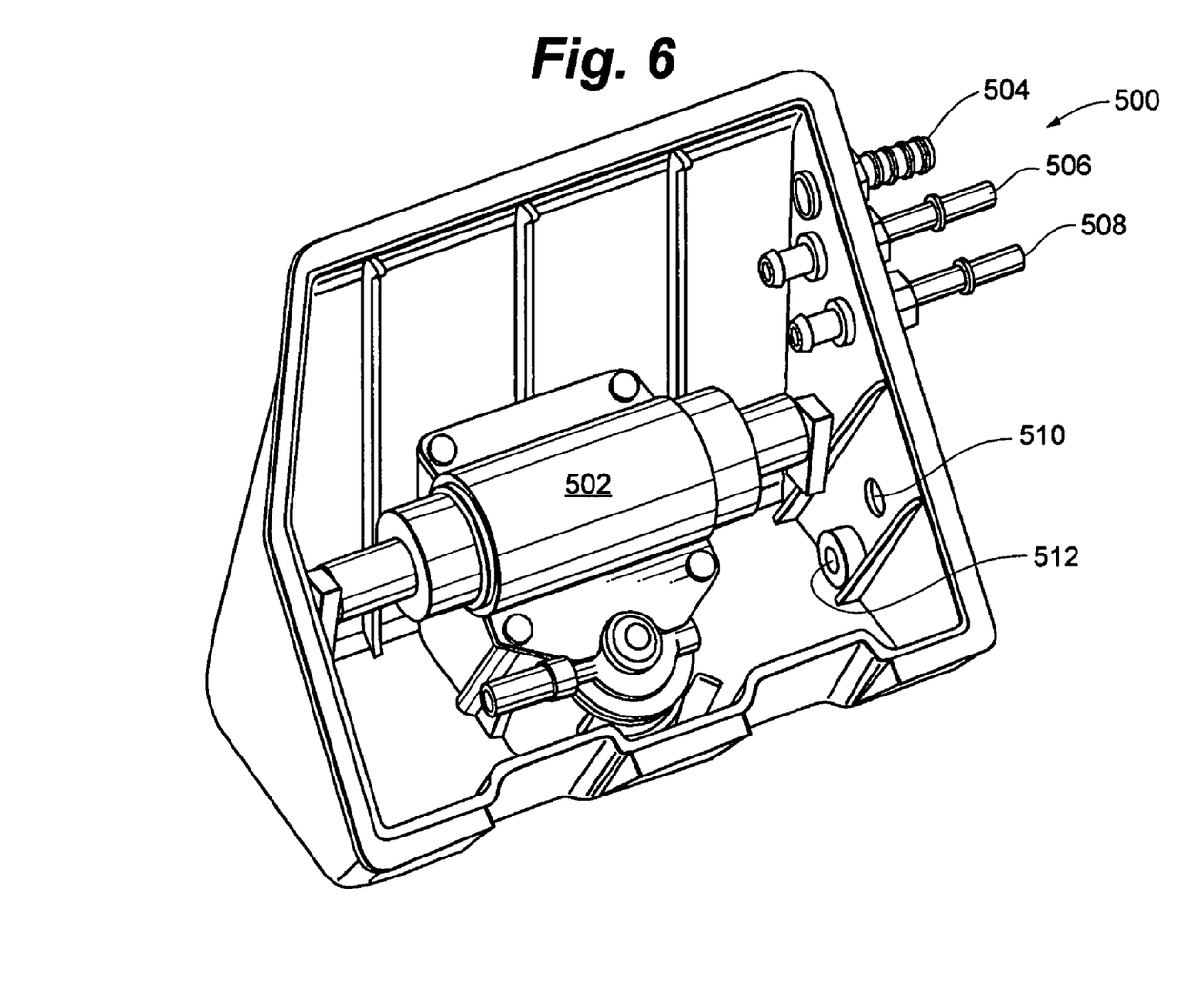
FIG. 6 shows an external sump in an embodiment of the present teachings.

With reference to FIG. 6, an external sump in an embodiment of the present teachings is shown. External sump 500 would be located external to fuel tank 402 and could have a fuel pump 502 located within. External sump 500 could further have a bleed line 504, a supply line 506, and a return line 508. Additionally, external sump 500 could have a gravity feed line 510 from main tank 402 and/or a transfer pump line 512 into sump tank 500. It is contemplated sump 500 could have most any size or shape within the packaging restrictions of the vehicle without departing from the spirit of the invention.

Figure 7:
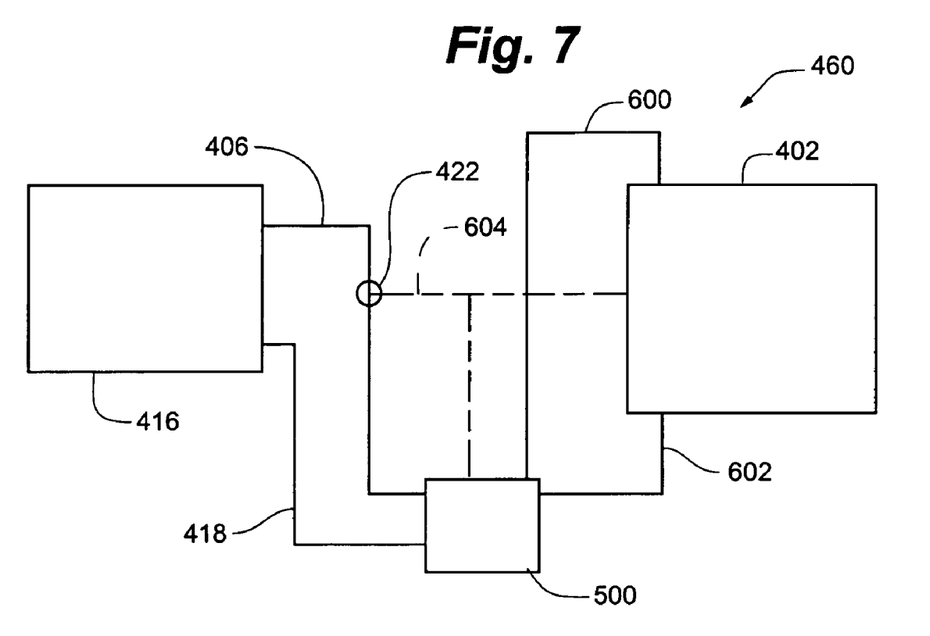
FIG. 7 shows a schematic representation of a fuel tank sump system incorporating some embodiments of the present teachings.

With reference to FIG. 7, a schematic representation of a fuel tank sump system incorporating some embodiments of the present teachings is shown. In fuel system 460, sump 500 is located externally of tank 402. A gravity line 602 can run from tank 402 to external sump 500. Gravity line 602 can have a check valve to prevent possible back flow into tank 402. A bleed line 600 can run from the top of sump 500 to the top of tank 402 to allow fuel vapor to leave sump 500, which is accomplished in internal sump 404 by simply having the top of sump 404 open. In operation, fuel would flow by gravity through line 602 into sump 500. Fuel pump 502 can then pump fuel to engine 416 through supply line 406. In addition, excess fuel can be returned to sump 500 through return line 418. Additionally, pressure regulator 422 can be used in supply line 406 in a deadhead system and the return flow could be routed through a return line 604 to sump 500 for tank 402.

Figure 8:
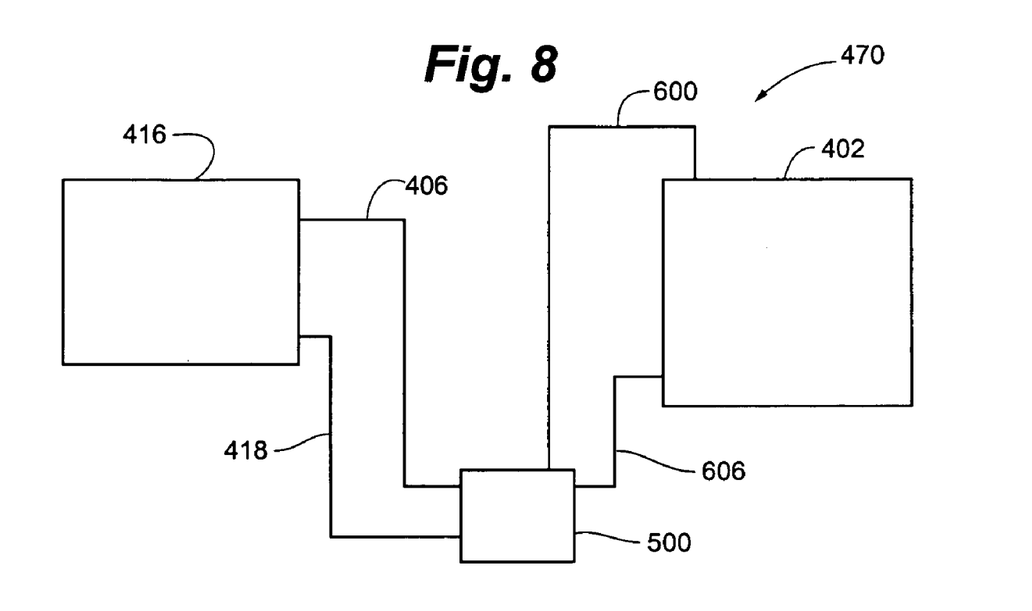
FIG. 8 shows a schematic representation of a fuel tank sump system incorporating some embodiments of the present teachings.

With reference to FIG. 8, a schematic representation of a fuel tank sump system incorporating some embodiments of the present teachings is shown. Fuel system 470, can have a transfer pump 606 used to pump fuel from tank 402 to sump 500. Transfer pump 606 can be internal to main tank 402, between main tank 402 and sump 500, or internal to sump 500 depending on design choice and the kind of transfer pump used.

Figure 9:
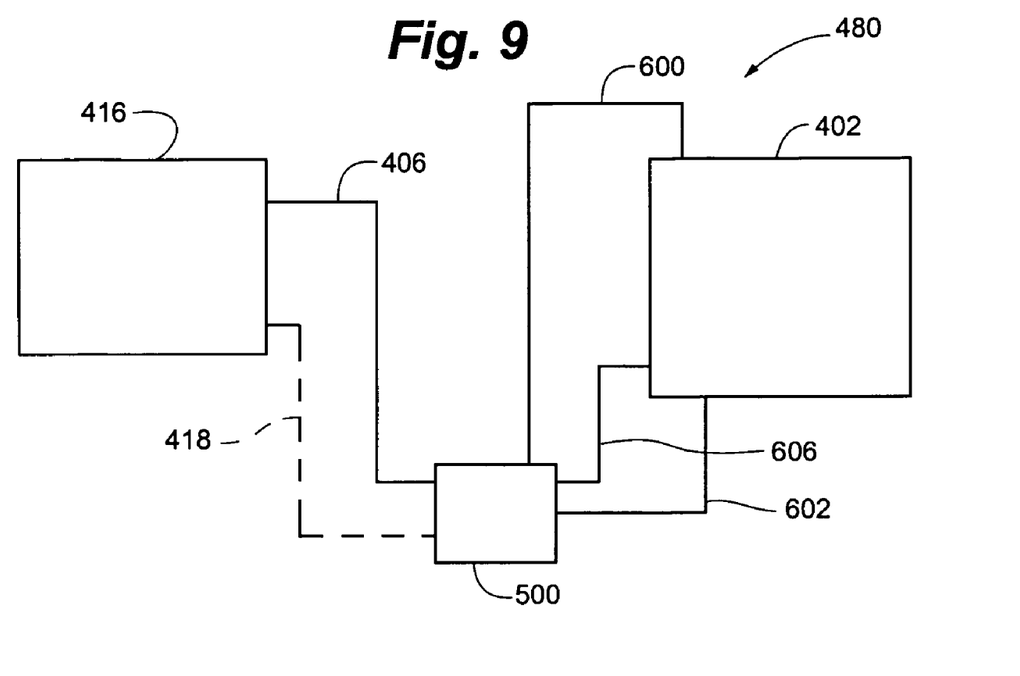
FIG. 9 shows a schematic representation of a fuel tank sump system incorporating some embodiments of the present teachings.

With reference to FIG. 9, a schematic representation of a fuel tank sump system incorporating some embodiments of the present teaching is shown. Fuel System 480 can have a gravity feed line 602 from tank 402 into sump 500 and a transfer pump 606 pumping fuel from sump 500.

Figure 10:
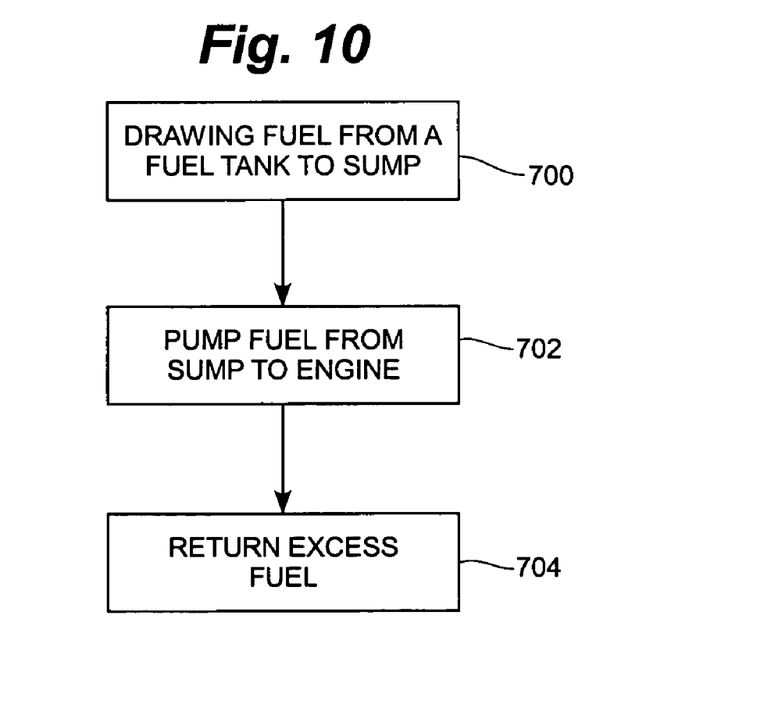
FIG. 10 shows a flow diagram of operation of a fuel tank system incorporating some embodiments of the present teachings.

With reference to FIG. 10, a flow diagram of operation of a fuel tank system incorporating some embodiments of the present teachings is shown. As discussed above, in operation, fuel is transferred from fuel tank 402 into sump tank 404 or 500 at state 700. The fuel can be pumped from sump tank 404 or 500 to engine 416 in vehicle 30 at state 702. Additionally, at step 704, excess fuel can be returned through a return line 418 to sump tank 404 or 500 at state 704

Thus, embodiments of the SNOWMOBILE FUEL SYSTEM SUMP TANK are disclosed. One skilled in the art will appreciate that the present teachings can be practiced with embodiments other than those disclosed. The disclosed embodiments are presented for purposes of illustration and not limitation, and the present teachings are limited only by the claims that follow.

What is claimed is:

1. A snowmobile, comprising:
 a chassis;
 a straddle-type seat mounted to the chassis;
 a handlebar assembly carried by the chassis;
 an endless track carried by a rear suspension system mounted to the chassis;
 a front suspension system mounted to the chassis;
 left and right steerable skis carried by the front suspension system, the skis being steerably connected to the handlebars,
 a fuel injected engine operably coupled to drive the endless track;
 a fuel tank;
 a sump tank operatively coupled with the fuel tank;
 a check valve located at the bottom of the sump tank that passes fuel from the fuel tank to the sump tank;
 a transfer pump operatively coupled to the fuel tank and the sump tank for transferring fuel from the fuel tank to the sump tank;
 a fuel pump coupled to the sump tank; and
 a fuel supply line coupled to the fuel pump and to the engine.

2. The snowmobile as in claim 1, further comprising,
 a fuel return line in fluid communication with the engine for returning fuel; and
 the fuel return line being in fluid communication with the sump tank to supply returned fuel to the sump tank.

3. The snowmobile of claim 1, further comprising a transfer pump operatively coupled to the fuel tank and the sump tank for transferring fuel from the fuel tank to the sump tank.

4. The snowmobile of claim 3, wherein the transfer pump is located within the fuel tank.

5. The snowmobile of claim 1, wherein the sump tank is located within the fuel tank and has a smaller volume than the fuel tank.

6. The snowmobile of claim 1, wherein the sump tank is located external to the fuel tank.

7. A fuel sump system, comprising:
 a fuel tank;
 a fuel sump tank in fluid communication with the fuel tank to receive fuel from the fuel tank;
 a check valve located at the bottom of the sump tank that passes fuel from the fuel tank to the sump tank; and
 a fuel pump having an intake positioned in the sump tank to pump fuel from the sump tank to an engine via a fuel supply line.

8. The fuel sump system as in claim 7, further comprising,
a fuel return line in fluid communication with the engine for returning fuel; and
the fuel return line being in fluid communication with the sump tank to supply returned fuel to the sump tank.

9. The fuel sump system as in claim 7, wherein the sump tank is located within the fuel tank.

10. The fuel sump system as in claim 7, wherein the fuel pump is located external to the sump tank.

11. The fuel sump system as in claim 8, further comprising a fuel pressure regulator operably coupled to the return line.

12. The fuel sump system as in claim 7, further comprising a transfer pump operatively coupled to the fuel tank and the sump tank for transferring fuel from the fuel tank to the sump tank.

13. The fuel sump system as in claim 12, wherein the transfer pump is located external to the fuel tank.

14. A snowmobile, comprising:
a chassis;
a straddle-type seat mounted to the chassis;
a handlebar assembly carried by the chassis;
an endless track carried by a rear suspension system mounted to the chassis;
a front suspension system mounted to the chassis;
left and right steerable skis carried by the front suspension system, the skis being steerably connected to the handlebars,
a fuel injected engine operably coupled to drive the endless track;
a fuel tank;
a sump tank operatively coupled with the fuel tank;
a fuel pump coupled to the sump tank;
a check valve located at the bottom of the sump tank that passes fuel from the fuel tank to the sump tank; and
a fuel supply line coupled to the fuel pump and to the engine.

15. The snowmobile as in claim 14, further comprising,
a fuel return line in fluid communication with the engine for returning fuel; and
the fuel return line being in fluid communication with the sump tank to supply returned fuel to the sump tank.

16. The snowmobile of claim 14, further comprising a transfer pump operatively coupled to the fuel tank and the sump tank for transferring fuel from the fuel tank to the sump tank.

17. The snowmobile of claim 14, further comprising a transfer pump operatively coupled to the fuel tank and the sump tank for transferring fuel from the fuel tank to the sump tank.

18. The snowmobile of claim 14, wherein the sump tank is located within the fuel tank and has a smaller volume than the fuel tank.

19. A snowmobile, comprising:
a chassis;
a straddle-type seat mounted to the chassis;
a handlebar assembly carried by the chassis;
an endless track carried by a rear suspension system mounted to the chassis;
a front suspension system mounted to the chassis;
left and right steerable skis carried by the front suspension system, the skis being steerably connected to the handlebars,
a fuel injected engine operably coupled to drive the endless track;
a fuel tank;
a sump tank operatively coupled with the fuel tank;
a transfer pump operatively coupled to the fuel tank and the sump tank for transferring fuel from the fuel tank to the sump tank;
a check valve located at the bottom of the sump tank that passes fuel from the fuel tank to the sump tank;
a fuel pump coupled to the sump tank; and
a fuel supply line coupled to the fuel pump and to the engine.

20. The snowmobile as in claim 19, further comprising,
a fuel return line in fluid communication with the engine for returning fuel; and
the fuel return line being in fluid communication with the sump tank to supply returned fuel to the sump tank.

21. The snowmobile of claim 19, further comprising a transfer pump operatively coupled to the fuel tank and the sump tank for transferring fuel from the fuel tank to the sump tank.

22. The snowmobile of claim 19, wherein the sump tank is located within the fuel tank and has a smaller volume than the fuel tank.

23. A method for providing fuel to a fuel injected, off road vehicle selected from the group consisting of snowmobiles, personal watercraft, utility vehicles, motorcycles, and all terrain vehicles, the method comprising:
transferring the fuel from a fuel tank into a sump tank, wherein a check valve located at the bottom of the sump tank transfers the fuel from the fuel tank to the sump tank; and
pumping the transferred fuel from the sump tank to an engine in the vehicle.

24. The method of claim 23, further comprising the steps of returning fuel that is not fuel injected into the engine; and feeding the returning fuel to the sump tank.

25. The method of claim 23, wherein a transfer pump is operatively coupled to the fuel tank and the sump tank transfers fuel from the fuel tank to the sump tank.

26. The method of claim 23, wherein a transfer pump is operatively coupled to the fuel tank and the sump tank transfers fuel from the fuel tank to the sump tank.

27. The method of claim 23, wherein the sump tank is located within the fuel tank.

28. A method for providing fuel to a fuel injected, off road vehicle selected from the group consisting of snowmobiles, personal watercraft, utility vehicles, motorcycles, and all terrain vehicles, the method comprising:
transferring the fuel from a fuel tank into a sump tank, wherein a check valve located at the bottom of the sump tank transfers the fuel from the fuel tank to the sump tank; and
pumping the transferred fuel from the sump tank to an engine in the vehicle.

29. The method of claim 28, further comprising the steps of returning fuel that is not fuel injected into the engine; and feeding the returning fuel to the sump tank.

30. The method of claim 28, wherein a check valve located at the bottom of the sump tank transfers the fuel from the fuel tank to the sump tank.

31. The method of claim 28, wherein a transfer pump is operatively coupled to the fuel tank and the sump tank transfers fuel from the fuel tank to the sump tank.

32. The method of claim 28, wherein the sump tank is located within the fuel tank.

33. A system to provide fuel to an engine during extreme attitudes, comprising:
means for transferring the fuel from a fuel tank into a sump tank;

means for pumping the transferred fuel from the sump tank to an engine in the vehicle, a fuel pump for returning fuel that is not fuel injected into the engine, wherein the fuel pump is operably coupled to a check valve located at the bottom of the sump tank; and means for feeding the returning fuel through tubing to the sump tank.

34. The system of claim 33, wherein the means for transferring fuel from the fuel tank into the sump tank comprises a transfer pump operatively coupled to the fuel tank and the sump.

35. The system of claim 34, wherein the transfer pump is located within the fuel tank.

36. The system of claim 33, wherein the means for pumping the transfer fuel from the sump tank to the engine comprises a fuel pump.

37. The system of claim 33, wherein the fuel pump is located within the sump tank.

* * * * *